United States Patent [19]

Hamamoto et al.

[11] 4,178,145

[45] Dec. 11, 1979

[54] EXTRUSION DIE FOR CERAMIC HONEYCOMB STRUCTURES

[75] Inventors: Shoichi Hamamoto; Masaaki Hiwatashi, both of Kyoto, Japan

[73] Assignee: Kyoto Ceramic Co., Ltd., Kyoto, Japan

[21] Appl. No.: 860,053

[22] Filed: Dec. 13, 1977

Related U.S. Application Data

[63] Continuation of Ser. No. 679,975, Apr. 26, 1976, abandoned.

[51] Int. Cl.² .............................................. B29F 3/04
[52] U.S. Cl. .................................... 425/199; 425/380; 425/467
[58] Field of Search ................ 425/382 R, 382.2, 464, 425/192, 198, 199, 467, 197, 376, 380; 264/177 R

[56] References Cited

U.S. PATENT DOCUMENTS

| | | | |
|---|---|---|---|
| 2,908,037 | 10/1959 | Harkenrider | 425/192 |
| 3,836,302 | 9/1974 | Kaukeinen | 425/197 |
| 3,888,963 | 6/1975 | Orso et al. | 425/197 X |
| 3,905,743 | 9/1975 | Bagley | 425/382 X |
| 4,008,033 | 2/1977 | Folmar et al. | 425/467 |

*Primary Examiner*—Mark Rosenbaum
*Attorney, Agent, or Firm*—Spensley, Horn and Lubitz; Richard H. Zaitlen

[57] ABSTRACT

An extrusion die for forming thin-walled honeycomb structures is provided comprising a plurality of discharge slots for forming unit cells of a predetermined web thickness formed transversely in the die to a predetermined depth in the outlet face and a plurality of mutually independent feed passageways formed transversely in the die extending from the inlet face of the die and communicating with the discharge slots. The cross-sectional area of the feed passageways is larger than the cross-sectional area of the discharge slots which are fed by the feed passageway, thereby applying sufficient flow resistance to the extrudable material and the discharge slot.

20 Claims, 11 Drawing Figures

PRIOR ART

EXTRUSION DIE FOR CERAMIC HONEYCOMB STRUCTURES

This is a continuation, of application Ser. No. 679,975, filed Apr. 26, 1976 now abandoned.

BACKGROUND OF THE INVENTION

1. Field of Invention

This invention relates to extrusion die structures and more particularly to extrusion dies for forming ceramic honeycomb structures.

2. Prior Art

Ceramic honeycomb structures made of cordierite, alumina or mullite show high mechanical strength and erosion resistance at high temperatutres. Since their manufacturing costs are low, their use with a coating of a catalyst material such as platinum, cobalt or manganese which convert toxic exhaust such as carbon monoxide and nitrogen oxides into carbon dioxide through oxidation and into nitrogen through reduction is increasing. Consequently, honeycomb type structures are being used for automobile exhaust systems and in the chemical industry as filters installed in catalytic cleaning towers or carriers for deodorant catalysts.

Figure 1:
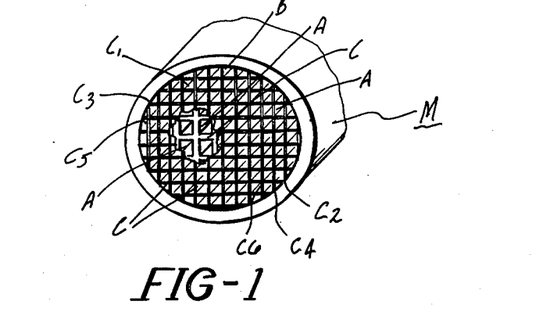
FIG. 1 is a oblique pictorial of an extruded honeycomb structure.

Honeycomb structures comprise a plurality of cores or cells colected in a desired configuration. The cross-section of the cells can be square, hexagonal, triangular, circular, or any desired geometric pattern. In FIG. 1 is given an example of a honeycomb article which is a ceramic honeycomb structure installed in an automobile muffler.

The ceramic honeycomb structure M has a cylindrical periphery, inside which a plurality of cell walls C having a thickness of between 0.3 mm and 1.0 mm are formed in a grid, and extend along the longitudinal axis of the structure. Accordingly, the ceramic honeycomb structure is a unitary body comprising a multiplicity of cell walls $C_1$, $C_3$, $C_5$, etc., and $C_2$, $C_4$, $C_6$, etc., arranged in rows and columns at an interval as short as the edge length of a single unit cell a. The cell walls enclose unit cells a which are arranged in close contact with each other and through which the exhaust gas flows. In addition, an outer casing or shell b is formed for protecting the thin-walled cells a so as to provide the honeycomb structure with sufficient mechanical strength.

Figure 2:
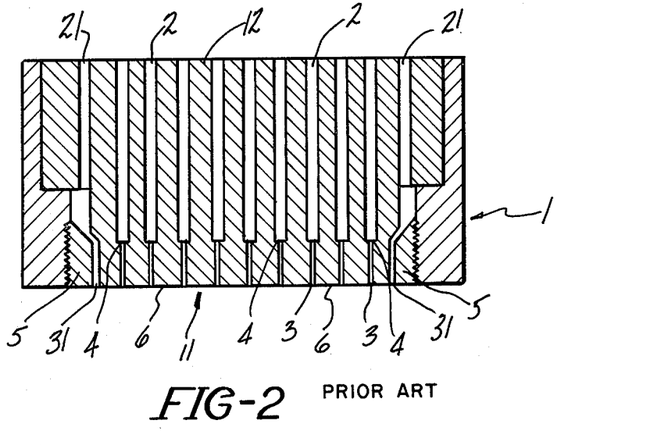
FIG. 2 is a cross-sectional elevational view of an extrusion die for making honeycomb structurs of the prior art.
Figure 3:
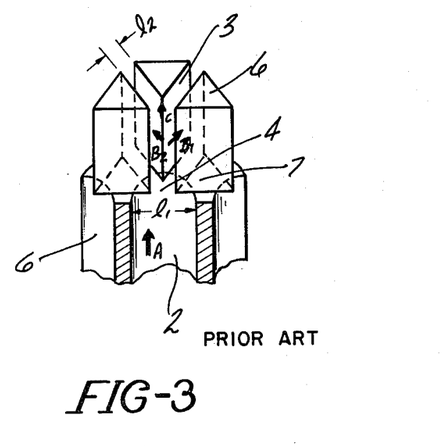
FIG. 3 is an enlarged fragmental oblique pictorial view of a die of the prior art illustrating the joint structure of the core pin routes.

Methods of making honeycomb structures and honeycomb extrusion dies are disclosed in U.S. Pat. No. 3,790,654 and No. 3,824,196, and are summarized below by referring to FIGS. 2 and 3. The extrusion die consists of a die body 1 having outlet and inlet faces 11 and 12. A plurality of feed passageways 2 communicate with the inlet face 12 and extend into the die body 1 to deliver extrudable material. A plurality of discharge slots 3 communicate with the outlet face 11 and extend into the die body, and are interconnected so as to form a gridwork (triangular as shown in FIG. 3). The feed passageways 2 are located at the intersections of the gridwork formed by the interconnecting discharge slots 3. The opening of $l_2$ of the discharge slots 3 is designed smaller than the opening $l_1$ of the feed passageways 2 so as to provide a suitable flow resistance to the extrudable material. About the gridwork formed by a plurality of feed passageways 2 and apart from said feed passageways, an circumferential orifice is provided so as to deliver a portion of the extrudable material for forming an outer casing b about the honeycomb matrix. Located about the periphery of the gridwork formed by the discharge slots 3 is a collar member 5 for providing flwo resistance to that portion of the extrudable material discharged from the orifice 21. The collar member 5 is threadably attached to the inner wall of the die body 1 and comprises a discharge opening 31 for forming the outer casing b. One core pin 6 in the die body 1 corresponds to one unit cell or core of the honeycomb article to be formed.

With the use of the extrusion die structure described above, ceramic articles are formed in the following steps as illustrated in FIG. 3. An extrudable batch material under pressure flows longitudinally through the feed passageways 2 as shown by the arrow A, and reaches that portion of the feed passageways 2 which communicates with the discharge slots 3. At this point, the spacing $l_2$ of the discharge slots narrows, thereby resisting the passage of the extrudable material to a great extent. Consequently, a portion of the batch material is caused to flow in lateral direction as indicated by arrows $B_1$ and $B_2$, and is finally discharged as a honeycomb structure having a coherent gridlike mass as indicated by arrow C.

The prior arts summarized above contain certain problems which are described hereinbelow. If a large number of fine cells are to be formed within a limited periphery of a honeycomb structure, a correspondingly large number of feed passageways with a larger opening that of the disclarge slot would have to be bored at an increasednumber of intersections of the an undesirable increase in manufacturing and labor costs. Furthermore, as the number of passageways bored in the die increases, the joint area 7 between core pin 6 and the die body 1 is reduced, thereby decreasing the mechanical strength of the attachment of the core pin 6 to the die body 1. Furthermore, the prior art die structure for forming a honeycomb structure with an outer case is extremely complex. Furthermore, it is extremely difficult to change the peripheral shape of the honeycomb structure unless separate die is prepared to fulfill the new design requirements. Also, with the large number of fine cells and the corresponding large number of feed passageways, it is difficult to maintain sufficient extrusion pressure in the die. Another problem is that since the honeycomb structure immediately after extrusion contains water an d is too soft to maintain its own structural integrity, the honeycomb structure frequently distorts under its own weight.

In light of the above, the present invention is primarily concerned with an improved means to eliminate the above-mentioned shortcomings.

SUMMARY OF THE INVENTION

It is the general object of the present invention to provide a simplified extrusion die structure.

It is another object of the present invention to provide durable die structure with increased mechanical strength to keep the core pins attached to the die body.

It is yet another object of the present invention to provide a die structure which is easily adjusted with the die body unchanged to honeycomb structures of different peripheral shapes and of different cross-sectionalareas.

It is still another object of the present invention to provide an extruder die equipped with a means for guiding the extrudable batch material to flow density into the discharge slot and for drying and maintaining the structural integrity of the honeycomb structure immediately after extrusion to prevent possible distortion of the honeycomb structure.

In keeping with the principles of the present invention, the objects are accomplished by an extrusion die comprising a plurality of discharge holes for forming unit cells of a predetermined web thickness formed transversely in the die to a predetermined depth in the outlet face and a plurality of mutually independent feed passageways formed tranversely in the die and extending from the inlet face of the die and communicating with the discharge slots. The cross-sectional area of the feed passageways is larger than the cross-sectional area of the discharge slots which are fed by any given feed passageway, thereby applying sufficient flow resistance to the extrudable material in the discharge slot. In addition, the feed pasageways are arranged such that they do not communicate with every intersection of the plurality discharge slots. A means is provided together with the extrusion die for forming a outer case wihich is easily adjusted without changing the die body so that honeycomb structurs of different peripheral shapes and of different cross-sectional areas may be extruded. In addition, the extrusion die is further provided with ameans for drawing an maintaining the structural integrity of the ceramic honeycomb structure immediately after extrusion.

BRIEF DESCRIPTION OF THE DRAWINGS

The above mentioned and other features and objects of the present invention will become more apparent by reference to the follwing description taken in conjunction with the accompanying drawings, wherein like reference numerals denote like elements and in which:

FIG. 4($a$) is fragmental oblique pictorial view of a die assembly in accordance with the teachings of the present invention illustrating the orientation between the feed passageways and the discharge slots;

FIG. 4($b$) is a simplified diagram illustrating the orientation between the feed passageways discharge slots of a second embodiment of the extrusion die of the present invention in accordance with the teachings of the present invention;

FIG. 4($c$) is a simplified diagram illustrating the orientation between the feed passageways and the discharge slots of a third embodiment of an extrusion die in accordance with the teachings of the present invention;

FIG. 5($a$) and ($b$) are enlarged cross-sectional elevation views of the joint between a feed passageway and a discharge slot in an extrusion die in accordance with the teachings of the present invention illustrating the relationship between the two openings;

FIG. 6($a$) is a cross-sectional elevation view of an extrusion die in accordance with the teachings of the present invention equipped with a collar ring and illustrating the attachment of the die to the extruder;

FIG. 6($b$) is an enlarged cross-sectional fragmental elevation view of the area indicated by the circle in FIG. 6($a$);

FIG. 6($c$) is a cross-sectional view in elevation of a extrusiondie in accordance with the teachings of the present invention equipped with a control ring and a collar ring and illustrating the attachment of the die to an extruder; and FIG. 7 is a cross-sectional elevation view of an extruder in accordance with the teachings of the present invention.

DETAILED DESCRIPTION OF THE INVENTION

In order to comply with the primary objects of the present invention, in designing the present invention, the prior art design wherein the feed passgeways are located at every intersection of the gridwork formed by the discharge slots was rejected. Consequently, a further improvement was made in which the feed passageways are formed with desirable spacing there between. These improvements allow the ceramic extrudable batch material to flow uniformly and densely and at the same time, provide a secure attachment for the core pins on the die body. Preferring now to the drawings, the present invention is described with special emphasis on the improvements made upon prior art.

Figure 4A:
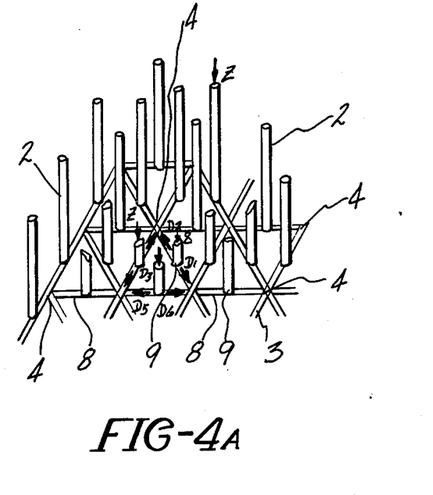

Referring to FIG. 4($a$), shown therein is one embodiment of an extrusion die in accordance with the teachings of the present invention. As shown in FIG. 4($a$) a feed paSsageway 2 is provided midway in the side 8 of the triangular core pins 6, but not at the intersection 4 of the gridwork formed by the discharge slots 3. In this orientation, the extrudable batch material flows through the passageways 2 in the Z direction. The extrudable batch material flows through feed passageways 2 and at position 5 where the feed passageways 2 end and the discharge slots begin, branches into the direction $D_1$, $D_2$, $D_3$, $D_4$, $D_5$, since the opening of the discharge slots 3 is smaller than that of the feed passageways 2. In order to divide the ceramic batch material from a single feed passageway 2 evenly into the discharge slots 3, the distances such as $D_1$ and $D_2$ are chosen to be equal. Owing to this improved design, in which the feed passageways 2 are placed midway on the sides of the discharge grid network, the extrudable ceramic batch material from the feed passageways flows into a single slot, but not into different slots as is the case with the prior art design in which the feed passageways are placed directly atevery intersection of the gridwork formed by the discharged slots and accordingly, a smooth flow of batch material is facilitated. Furthermore, the extrudable ceramic batch material delivered into the discharge slots flows into the intersection 4 of the discharge network and comes together so as to provide cell walls of the intersection4 with sufficient mechanical strength.

In the prior art which the feed passageways are located at every intersection of the discharge slots, a portion of ceramic batch material divided in intersection only after the side length of a core pin in more than two directions from the intersection.About midway on the side, another portion of the extruded batch material having traveled half the side length of the same core pin joins with the batch material travelling in the other direction. Since the extrusion pressure is weakest at the midway point where the portions of batch material join, a weld mark is formed at this joint. This weld mark is a sign of mechanical weakness and is liable to generate cracks due to thermal compression during firing or thermal shock in use. The dancer of this kind is successfully eliminated by the improved design of the present invention.

Figure 4B:
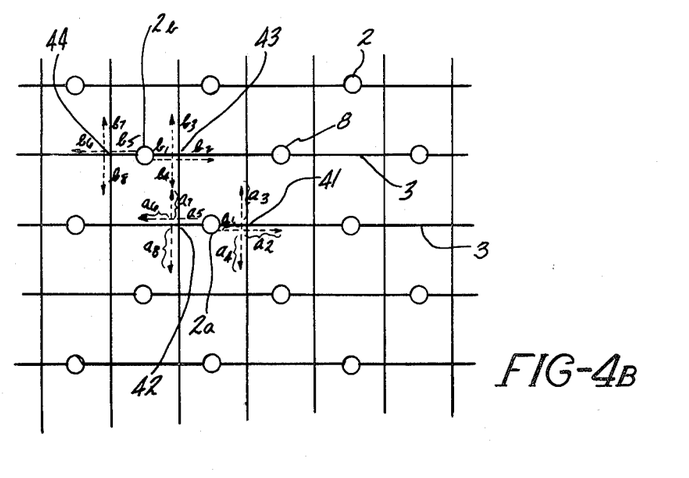

In referring to FIG. 4(b), shown therein is a second embodiment of the present invention. In FIG. 4, identical elements are denoted by identical reference numerals. The extrusion die of FIG. 4(b) comprises feed holes 2 placed midway on the sides 8 of the square discharge gridwork 3, with a desirable spacing between the feed passageway 2.

In operation for example, a portion of the extrudable batch material flowing through a particular feed passageway 2a in the vertical direction branches out at the end of the feed passageway 2a and travels in a discharge slot 3 half the length of a core pin side as denoted by $a_1$ and $a_5$. After reaching the nearest intersections 41 and 42 of the discharge grid network, the extrudable batch material branches out into two more directions, perpendicular to each other and further proceeds half the length of a core pin side as denoted by $a_3$ and $a_4$ and $a_7$ and $a_8$. The extrudable material further proceeds half of the length of a core pin side in the original direction of the discharge slot 3 as denoted by $A_2$ and $a_6$.

In a similar manner, another portion of the batch material delivered from another feed passageway 2b travels in the directions $b_1$ and $b_2$, and at the intersections 43 and 44 branches into two more directions as denoted by $b_3$ and $b_4$ and $b_7$ and $b_8$, and further proceeds as denoted by $b_2$ and $b_6$. The two portions of the batch material, one delivered from the feed passageway 2a and having proceeded along $a_5$ and $a_7$ and the other from feed passageway 2b and having proceeded along $b_1$ and $b_4$, merged to form a coherent cell wall. The same sequences of flow as described above is applied to any other portion of the batch material flowing from a feed passageway 2 and into a discharge slot 3.

Accordingly, the present invention provides extrusion dies of an improved design in which feed passageways 2 are located midway on the sides 8 of the discharge gridwork at an interval corresponding to one or more core pin sides and so arranged that ceramic extrudable batch material delivered from the feed passageways 2 may travel for the same distance from the center of the feed passageways 2. Owing to this improved design, a smaller number of feed passageways are required to be formed in a die body and a relatively large area is afforded to a core pin for it to be secured to the die body so as to strengthen the joints between the core pins and the die body. In the embodiment illustrated in FIG. 4(b), one feed passageway 2 delivers extrudable material for the length of ½ of a core pin side times 8, that is, the equivalent of the total wall length of a cell unit. However, the feed holes situated midway on the core pin side 8 may be arranged at any such interval so as to satisfy the equidistant delivery of extrudable material requirement and is not limited to the arrangement shown in FIG. 4(b) in which the feed passagewauys are situated on every other core pin side in a row. The arrangement of feed passageways of the present invention is beneficial with respect to the manufacturing cost and the mechanical strength of extrusion dies, especially in the event that numerous fine cells are required to be formed within the honeycomb structure within a limited periphery, thereby limiting the joint area afforded to a core pin.

Figure 4C:
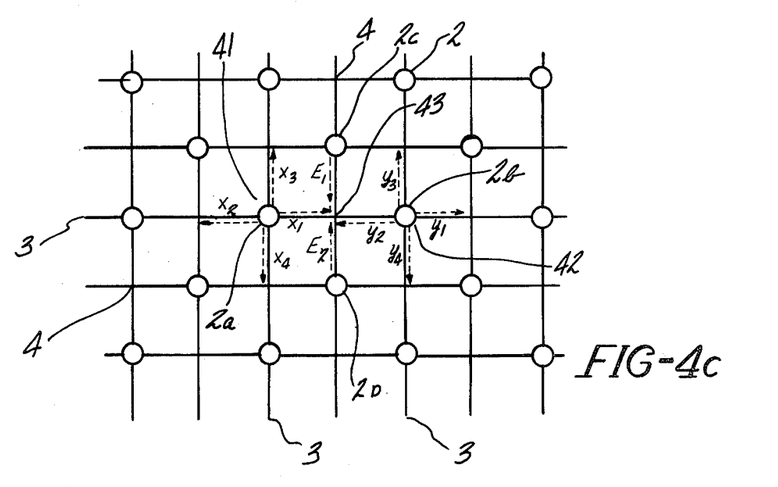

Referring to FIG. 4(c) shown therein is a third embodiment of the present invention. In the extrusion die of FIG. 4(c), although the feed passageways 2 are situated at the intersections 4 of the discharge slots 3, the feed passageways 2 are at every other intersection so as to form a diagonal gridwork as a whole. In operation, that portion of the extrudable material flowing vertically through feed passageway 2a, met the intersection 41 of the discharge sots 3 at the route of the feed passageway 2a and branches out into four discharge slots formed by the set of four neighboring core pins. The extrudable ceramic material then travels with a length of a core pin side as denoted by $X_1$, $X_2X_3$ and $X_4$. In a similar manner, another portin of extrudable material flowing vertically through another feed passageway 2b branches out at the intersection 42 and travels for the length of a core pin as denoted by $Y_1$, $Y_2$, $Y_3$ and $Y_4$. The same situation occurs at the route of the other feed passageways 2d and 2c. The four flows of extrudable material delivered by the feed holes 2a, 2b, 2c and 2d, respectively, and correspondingly having proceeded along $X_1$, $Y_2$, $E_1$ and $E_2$, merge at the intersection 43 so as to form a densely packed cell wall. In the embodiment described above, feed passageways 2 are formed at an interval of one or more core pins sides directly at the intersectin 4 of the discharge slots 3 and are arranged so that extrudable material may proceed equal distance from the intersections 4 laterally in the discharge slots 3. As a result of this improvement, a small number of feed passageways are required at the die body and a relatively large area is afforded to a core pin for it to be secured on the die body so as to strength the joint between the core pin and the die body. In the embodiment of FIGS. 4(c) one feed passageway 2 delivers extrudable material for the length of one core pin side times 4, the equivalent of the total wall length of a single unit cell. However, feed passageways 2 situated at the intersections of the discharge slots 3 may be arranged at any such interval as to satisfy the equidistant delivery of extrudable material requirement, but are not limited to the arrangements shown in FIG. 4(c). Extrusion dies with feed passageways arranged in accordance with the embodiment described above are beneficial with respect to the manufacturing cost and the mechanical strength of the dies, especially in situations where numerous fine cells are required to be formed in the honeycomb structure having a limited periphery.

Figure 5:
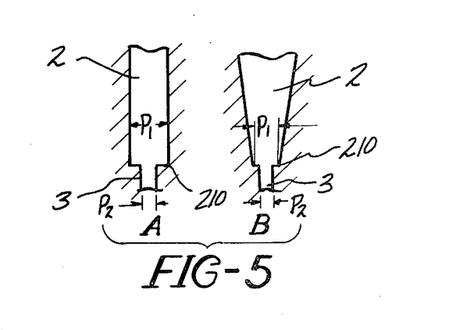

In the embodiments illustrated in FIG. 4(a), 4(b) and 4(c), the cross section of the feed passageways 2 compared to that of discharge slots 3 is so designed that the extrudible material may receive a required pressure when proceeding from the feed passageways from the discharge slots. Referring to FIG. 5 show here is a cross sectional view of the feed passageway and the discharge slot designed so as to meet the above described requirement.

In FIG. 5, the opening $P_1$ of feed passageway 2 at its route to 10 is always made larger than the opening $P_2$, or to be more precise, the total cross sectional area of the discharge slots 3 feed by a single passageay 2. It is already mentioned in reference to FIG. 4(a) there should be sufficientflow resistance so that the extrudible material extruded vertically through feed passageway 2 may branch at the roots of the feed passageways situated midway on the sides of the discharge gride work and proceed towards the inner sections of the gride work. Furthermore, there should be sufficient extrusion resistance maintained to discharge the surrounding gride work-like honey comb mast continuusly from the dye. Accordingly, to fulfill the process requirements described above, the dies shown in FIGS. 4(a), (b), and (c) have feed passageways so designed that the openings of the feed passageways 2 at its route 210 may delivery extrudible material sufficiently into the discharge slots within the delivery capacity of a single feed passageay. Particularly, the ratio of the cross sectional area of the feed passageway 2 to the total cross sectional area of the discharge slots 3 feed by a single feed passageway 2 has experimentally been determined to be equal to or more than 1.2. If the ratio is less than 1.2, there may not be sufficient extrudible material in the discharge slot to merge. In this cause the joint may generate cracks on firing or cause damage due to thermal shock and accordingly destroy the surrounding honeycomb structure. The upper limit of the above described ratio has been determined to be approximately 4. Excessively large ratios weaken cell wallstructure and as a result of which the extruded grid-like honeycomb warps. Referring to FIG. 5(b), shown there is another embodiment of feed passageway design. In this embodiment the feed passageway 2 is tapered toward its root so as to gain more flow resistance. The relationship between spacing $P_1$ and $P_2$ are the same as that in FIG. 4(a). In light of the costs of die manufacturing, the simple design of the passageway 2 shown in FIG. 5(a) is more favorble.

Figure 6A:
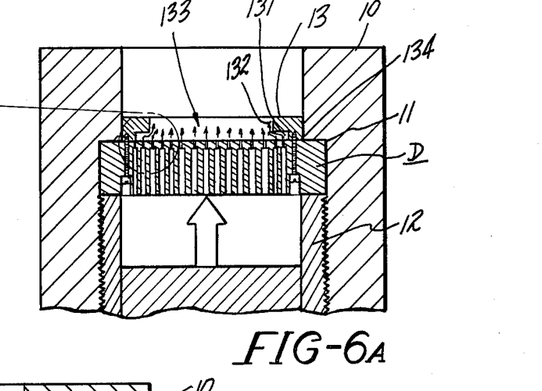
Figure 6B:
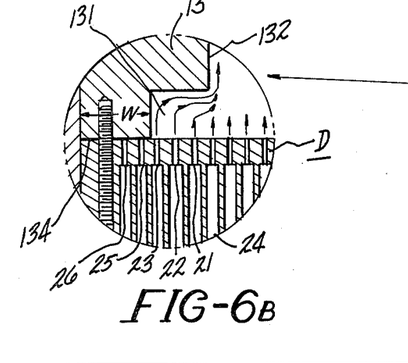

Referring to FIGS. 6(a) and 6(a), shown therein is the die of the present invention mounted together with a collar ring in an extruder for forming honeycomb structure having a thick walled outer case and for controlling the size of the periphery of the honeycomb structure. The die D together with the collar ring 13 is attachedto the outlet of an extruding machine or extrudr. The die D is first inserted into the attachment 10 and fits into a step on the inside of the attachment 10. The attachment 10 is in turn threadably fastened to the extruder body 12. The die D is provided with an annular shaped collar ring 13 about the periphery of its outlet face. Owing to the collar ring 13, extrudible material delivered by one or more discharge slots 21, 22, 23 as shown in FIG. (b) situated under the collar ring 13 is forced to merge in the L-shaped cavity 131 formed by the collar ring 13 and the outlet face of die D. The extrudible material of discharge slots 21, 22 and 23 are forced to join together with that portion of the batch material extruded through discharge slot 24 by the collar ring 13. Accordingly, along the periphery 132 of collar ring 13, a coherent mass of extrudible material is extruded to form an outer case of a thickness larger than the width of a discharge slot. Accordingly, the installation of the collar ring facilitates the forming of an outer case without the addition of a complexorifice and collar member as used in the prior art.

As previously mentioned, ceramic honeycomb stracture made of a plurality of thin walled cells. Consequently a honeycomb structure extruded without a thick outer case or shell has mechanically weak cell walls exposed on the periphery. In light of this fact, it is more beneficial to use the aforementioned collar ring 13 in the case of forming a honeycomb structure made of thick walled cells. The use of the aforementionec collar ring 13 is also advantageous in that a change in the peripheral shape of the honeycomb structure can be accommodated for by simply choosing an adequate collar ring among those in stock. To be more specific, theperipheral shape of the honeycomb structure can be changed by changing the shape of the opening 133 of collar ring 13. Furthermore, the thickness of the outer casing can be changed by adjusting the width W, shown in FIG. 6(b), of the leg 134 of the L-shaped collar ring 13 either to add to or block the flow of extrudible material from the discharge slots 25 and 26.

Figures 6C, 7:
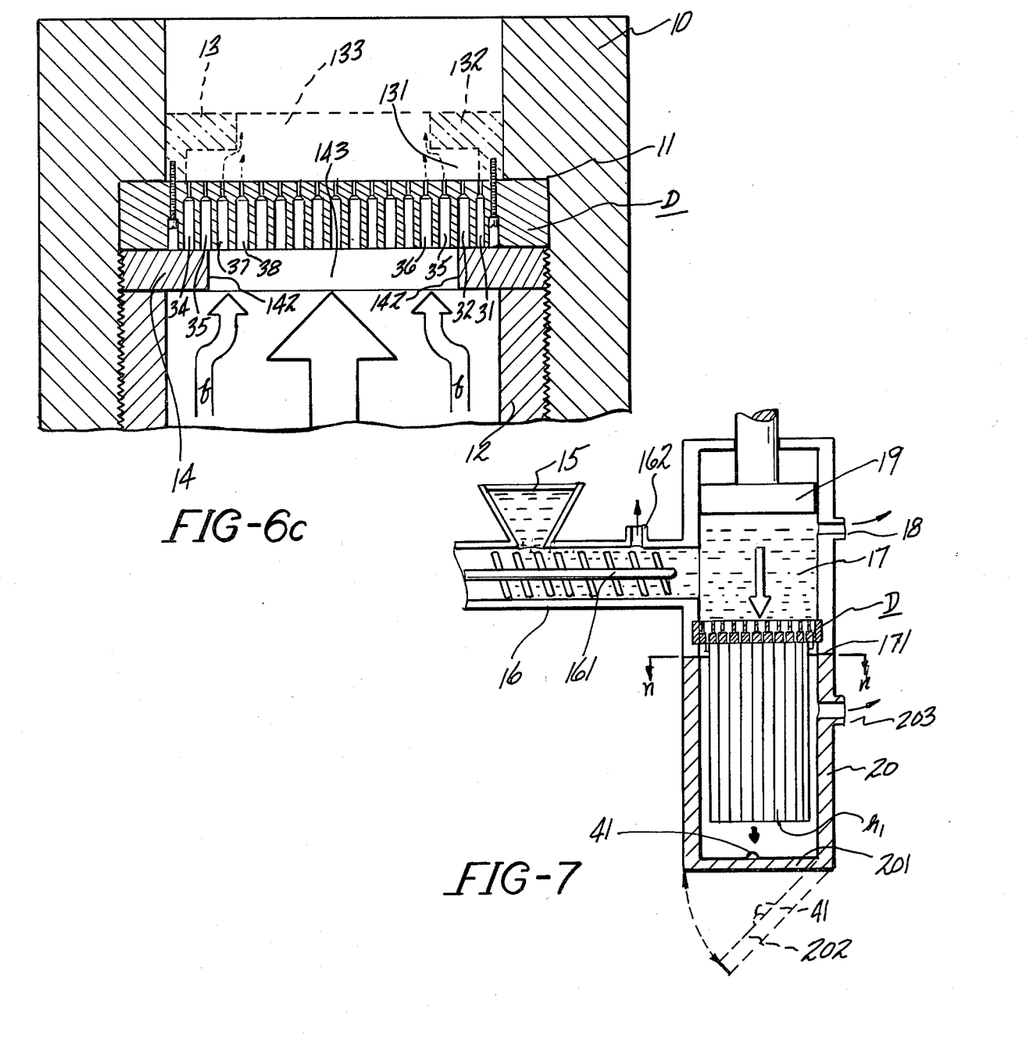

Referring to FIG. 6(c), shown therein is another die structure D with a different mechanism for controlling the peripheral shape and diameter of the extruded honeycomb structure. This die structure is characterized in that a ring 14 is threadably inserted in the attachment 10 and fastened about the periphery of the inlet face of the extrusion die D to control the delivery of ceramic extrudible material. When installed in the extrusion cylinder 12, the aforementioned control ring 14 functions as a baffle against the flow of extrudible material thereby preventing the extrudible material from flowing into the feed passageways 31, 32, 33, 34 covered by the control ring 14. Accordingly, the control ring 14 controls the peripheral dimensions in a similar manner to the collar ring 13 previously mentioned. The peripheral shape is controlled by selecting the shape of the outlet 143 of the control ring 14. As indicated by dotted lines in FIG. 6(c), the aforementioned collar ring 13 can also be installed about the outlet face of the extrusion die D together with the control ring 14. The simultaneous installation of both the collar ring 13 and the control ring 14 at the outlet and inlet faces of the die D, respectively, eliminates the necessity of using an excessively thick leg 134 for the collar ring 13 and further facilitates the outer casing or shell of the honeycomb structure. However, for the collar ring 13 to be functional the diameter of the opening 143 of the control ring 14 should be larger than that of the outlet 133 of the collar ring 13. It should be apparent to one skilled in the art that the installation of the die in the extruder described above in no way limits the invention and is but one of many ways of installing the die D in the extruder.

As for extruders, both hydraulic plunger type and auger types can be used withthe die D, collar ring 13 and control ring 14. Often an dditional option of a vacuum degasing device for extracting gas bubbles from the extrudible ceramic material is utilized in the extruder. In the case of an extruder with an extrusion die of the present invention installed at the outlet, the gridwork-like honeycomb mass, immediately after extrusion, consists of ceramic raw material containing organic plasticizers such as carboxymethyl cellulose or polyvinyl alcohol or such inorganic plasticizer as clay and water. As a result, the honeycomb structure may not have sufficient mechanical strength to sustain its shape and is liable to warp under its own weight or by outer forces. As shown in FIG. 7, to solve this problem a bucket 20, which can be evacuated, is added at the outlet extruder equipped with the extrusion die in accordance with the teachings of the present invention. The extrusion process utilizing the extruder shown in FIG. 7 is described as follows as a sequence of events. First, ceramic batch material is introduced into the hopper 15 and transported to the vertical cylinder 17 of the extruder by the rotary motion of the auger 161. After the cylinder 17 of filled with the ceramic batch material, further supply of the batch material is cut off by stopping the auger 161. Through evacuation outlet 18 formed in the wall of the extruder body, the vacuum degasing of the batch material is carried out. Then the hydraulic plunger 19 is lowered and under a great pressure presses downward the extrudible material in the cylinder 17 so as to force the batch material into the extrusion die D. The extruded honeycomb mass is received by bucket 20. The bucket 20 is attached to the outlet 171 of the extruder and is made from metal or plastic. The upward end of bucket 20 is open and the bottom end is closed. As soon as the first portion of the honeycomb structure is received into the bucket, the bucket is evacuated via evacuation outlet 203 formed in the vicinity of the upper end of bucket 20. The vacuum evacuation drys the grid-like mass containing water to an extent that the honeycomb structure may sustain its shape in the bucket 20 and not warp during transfer to other processes such as sizing or drying. When the honeycomb structure reaches the buckets bottom 201, which is located at a length approximately equal to the length of one stroke of the plunger 19, the extruded honeycomb structure touches an end limit switch 41 attached to the center of the buckets bottom 201. This switch 41 stops plunger 19 and the plunger 19 begins to move upward terminating its pressing action. When plunger 19 first moves upward, vacuum of evacuation of the bucket 20 is terminated. The bucket is then removed from the outlet 171 of the extruder and the honeycomb structure, which has been vacuumed dried especially at the lower part $H_1$, is cut along line n-n on the extrusion die outlet face. One cycle of the above described extrusion process terminates at the time when the plunger 19 reaches the upper dead point in its stroke and thereafter the whole extrusion cycle continuously repeats itself.

The outlet 162 iss for an optional vacuum evacuation of the auger body 16. In addition although the bottom 201 of the bucket 20 is closed to maintain a vacuum inside, it is possible to install a movable cover 202 equipped with the end limit switch 41 at the buckets bottom 201 as shown by the dotted lines in FIG. 7. Then, the honeycomb structure can be taken out, not from the upper opening of the bucket but iron the bottom of the bucket 20 with the better dried lower portion $H_1$ securely supporting the honeycomb structure. Accordingly, utilizing the bucket 20 and vacuum evacuation to dry the honeycomb structure, the cumbersome operation following the estrusion of the honeycomb mass of interrupting the extrusion cycle and drying the honey comb mass with a burner as suggested by the prior art is avoided. Accordingly, with an extruder in accordance with the teachings of the present invention, continuous extrusion, mass production, and satisfactory initial drying for maintaining structural integrity of the honeycomb structure is achieved.

Additionally, the bucket 20 can be attached to the extrusion cylinder with the help of a gasket inserted between the outlet 171 of the extrusion cylinder and the upper end of the bucket 20 and fastened either by the effects of suction or by mechanical means such as threading or tight fitting insertion. Furthermore, the bucket 20 can also be used as a transfer container of the extruded honeycomb mass. In light of this, a plurality of buckets may be used in accordance with the extrusion rate of the extrusion process. In this case, buckets 20 are used both to protect the honeycomb mass contained inside against outer forces and to transfer the honeycomb mass.

Some examples of the present invention are described hereinbelow:

A. Example 1

Material: A mixture of 100 parts by weight of alumina, 3 parts by weight of carboxymethyl cellulose and 20 parts by weight of water having been needed for appropriate plasticity for extrusion.

Extruder: Hydraulic plunger type equipped with a bucket as shown in FIG. 7 and having vacuumevacuation outlets.

Die Dimensions and Shape: Triangular discharge gridwork with the same orientation between the discharge slots and the feed passageways as shown in FIG. 4 (a). The discharge slot is 0.5 millimeters wide, 2 millimeters long and 10 millimeters deep. The feed passageway has an opening of 1.7 millimeters in diameter is 19 millimeters long. The die is 180 in diameter at the inlet face. The discharge slots and feed passages are formed within an area of 117 millimeters in diameter. The collar ring is 150 millimeters in outside diameter and 100 millimeters at the inner periphery.

Extrusion Conditions: The extrusion pressure is 400 kilograms per square centimeter with an extrusion rate of approximately 1000 millimeters per inch and having an extrusion temperature of 25° C. The vacuum in the bucket is 20 Trr.

Extrusion Products: Under the conditions described above a gridwork-like mass is produced which is bounded by an approximately 2 millimeter outer shell and having triangular cells with 0.5 millimeters thick cell walls and 2 millimeters long cell sides. No warp is present in the gridwork-like mass after it was cut apart from the extrusion die. After being fired at 1,350° C., the gridwork-like mass resulted in a porous honeycomb structure having 28 percent water absorption.

B. Example 2 material: A mixture of 100 parts by weight of cordierite 5 parts by weight of polyvinyl alcohol and 20 parts by weight of water having been kneaded to the appropriate elasticity for extrusion.

Extruder: The same as used in Example 1.

Die Dimensions and Shape: The orientation between the discharge slots and the feed passageways is as shown in FIG. 4(c). The discharge slot is 0.3 millimeters wide, 1.8 millimeters long and 7 millimeters deep. The feed passageway has an opening 2.3 millimeters in diameter and is 19 millimeters deep. The coloring is the same as in Example 1.

Extrusion Conditions: The extrusion pressure is 200 kilograms per square centimeter at an extrusion rate of 700 millimeters per minute and an extrusion temperature of 60° C. The vacuum in the bucket is 100 ton.

Extruded Products: Under the conditions described above a gridwork-like consisting of square cells with 0.3 millimeters thick cell walls is produced. No warp was seen in the grid-like mass after it was cut apart from the extrusion die. After being fired at 1,300° C., the gridwork-like mass resulted in a porous honeycomb structure with 23 percent water absorption.

As would be readily understood from the above description, the present invention provides an extrusion die in which the orientation between the feed passageways and the discharge slots is designed in such a manner that the feed passageways are situated at the mid point of the core pin sides, at the inner sections of the discharge or at any other appropriate position on the core pin sides such that the ceramic extrudible material fed by the feed passageways may spread equidistantly. As a result, the present invention provides an improved means to deliver the dense flow of ceramic extrudible material required and at the same time to strengthen the joint between the core pins and the body of the extrusion die assembly, especially for those dies to produce honeycomb structures having a very high density of fine thin walled cells. Furthermore, the collar ring with or without a control ring attached to the die provides a simple means of forming the thick walled outer shell about the honeycomb without employing extrusion dies of complex structures and further accommodates the change in the peripheral shape and the cross sectional area of the honeycomb structure so that the same extrusion die might be used for wide applications. In addition, to the outlet of the extruder equipped with an extrusion die in accordance with the teachings of the present invention is attached a bucket with a vacuum evacuation outlet to contain the extruded gridwork-like mass. This bucket facilitates the initial drawing of the gridwork-like mass to sustain its shape without interrupting the extrusion process. The bucket can also be used both for the protection and transfer of the gridwork-like mass.

In all cases it is understood that the above described embodiments are merely illustrative of but a few of the many possible specific embodiments which represent the applications of the principals of the present invention. Furthermore, numerous and varied other arrangements can be readily devised in accordance with the principals of the present invention in the art without departing from the spirit and scope of the invention.

We claim:

1. An extruder comprising:
   an extrusion die of the type having an inlet and outlet face for forming honeycomb structures from extrudible material, said extrusion die comprising:
   a plurality of intersecting discharge slots forming appropriately arranged core pins, said slots being of a predetermined width and formed in said die to a predetermined depth in a direction from the outlet face of said die towards the inlet face; and
   a plurality of mutually independent feed passageways formed in a direction from the inlet face of said die towards the outlet face and communicating with said discharge slots, said feed passageways being placed midway on a side of said core pins, said passageways furtner having a cross sectional area larger than the total cross sectional area of the discharge slots which are feed by said feed passageways; and
   a bucket having an open upper and a closed lower end coupled to the outlet face of said extrusion die, said bucket further being provided with an evacuation outlet whereby the bucket is evacuated to facilitate the initial drying of said honeycomb structure for maintaining the structural integrity of the honeycomb structure.

2. An extruder according to claim 1 further comprising:
   an extrusion cylinder;
   an auger coupled to said cylinder for delivering extrudible material to said cylinder;
   a hopper coupled to said auger cylinder; and
   a hydraulic plunger provided within said cylinder for pressing extrudible material downward and into said extrusion die, said cylinder being provided with an evacuation outlet whereby said cyliner is evacuated thereby removing the air bubbles from the extrudible material contained in the cylinder.

3. An extruder according to claim 1 wherein the lower end of said bucket comprises a movable cover.

4. An extruder according to claim 1 wherein said bucket is coupled to said outlet face of said extrusion die by the effect of the vacuum within said bucket.

5. An extruder according to claim 1 wherein said bucket is coupld to th outlet face of said die by mechanical means.

6. An extruder according to claim 1 further comprising an end limit switch provided in the lower end of said bucket, said end limit switch for controlling the downward movement of said hydraulic plunger.

7. An extruder according to claim 2 further comprising an end limit switch coupled to said movable cover, said end limit switch for controlling the downward movement of said hydraulic plunger.

8. An extruder comprising:
   an extrusion die of the type having an inlet and outlet face for forming honeycomb structures from extrudible material, said extrusion die comprising:
   a plurality of intersecting discharge slots forming appropriately arranged core pins, said slots being of a predetermined width and formed in said die to a predetermined depth in a direction from the outlet face of said die towards the inlet face; and
   a plurality of mutually independent feed passageways formed in a direction from the inlet face of said die towards the outlet face and communicating with said discharge slots, said feed passageways being placed at the intersections of said discharge slots with a spacing corresponding to at least one core pin so that said extrudible material may flow equidistantly in the lateral directions from said intersections, said passageways further having a cross sectional area larger than the total cross sectional area of the discharge slots which are feed by said feed passageways; and
   a bucket having an open upper end and a closed lower end coupled to the outlet face of said extrusion die, said bucket further being provided with an evacuation outlet whereby the bucket is evacuated to facilitate the initial drying of said honeycomb structure for maintaining the structural integrity of the honeycomb structure.

9. An extruder according to claim 8 further comprising:
   an extrusion cylinder;
   an auger coupled to said cylinder for delivering extrudible material to said cylinder;
   a hopper coupled to said auger cylinder; and
   a hydraulic plunger provided within said cylinder for pressing extrudible material downward and into said extrusion die, said cylinder being provided with an evacuation outlet whereby said cylinder is evacuated thereby removing the air bubbles from the extrudable material contained in the cylinder.

10. An extruder according to claim 8 wherein the lower end of said bucket comprises a movable cover.

11. An extruder according to claim 8 wherein said bucket is coupled to said outlet face of said extrusion die by the effect of the vacuum within said bucket.

12. An extruder according to claim 8 wherein said bucket is coupled to the outlet face of said die by mechanical means.

13. An extruder according to claim 8 further comprising an end limit switch provided in the lower end of said bucket, said end limit switch for controlling the downward movement of said hydraulic plunger.

14. An extruder according to claim 9 further comprising an end limit switch coupled to said movable cover, said end limit switch for controlling the downward movement of said hydraulic plunger.

15. An extruder comprising:
   an extrusion die of the type having an inlet and outlet face for forming honeycomb structures from extrudible material, said extrusion die comprising:

a plurality of intersecting discharge slots forming appropriately arranged core pins, said slots being of a predetermined width and formed in said in said die to a predetermined depth in a direction from the outlet face of said die towards the inlet face;

a plurality of mutually independent feed passageways formed in a direction from the inlet face of said die towards the outlet face and communicating with said discharge slots, said feed passageways being placed midway on a side of said core pins, said passageways further having a cross-sectional area larger than the total cross-sectional area of the discharge slots which are feed by said feed passageways; and a bucket having an open upper and a closed lower end coupled to the outlet face of said extrusion die, said bucket further being provided with an evacuation outlet whereby the bucket is evacuated to facilitate the initial drying of said honeycomb stucturek for maintaining the structural integrity of the honeycomb structure; and wherein said die has a control ring having a central opening coupled to the inlet face of said die so as to block the flow of extrudible material into said feed passageways situated under said control ring thereby controlling the peripheral shape and dimensions of the honeycomb structure.

16. An extruder comprising:

an extrusion die of the type having an inlet and outlet face for forming honeycomb structures from extrudible material, said extrusion die comprising:

a plurality of intersecting discharge slots forming appropriately arranged core pins, said slots being of a predetermined width and formed in said die to a predetermined depth in a direction from the outlet face of said die towards the inlet face;

a plurality of mutually independent feed passageways formed in a direction from the inlet face of said die towards the outlet face and communicating with said discharge slots, said feed passageways being placed at the intersections of said discharge slots with a spacing corresponding to at least one core pin so that said extrudible material may flow equidistantly in the lateral directions from said intersections, said passageways further having a cross-sectional area larger than the total cross-sectional area of the discharge slots which are feed by said feed passageways; and a bucket having an open upper end and a closed lower end cupled to the outlet face of said extrusion die, said bucket further being provided with an evacuation outlet whereby the bucket is evacuated to facilitate the initial drying of said honeycomb structure for maintaining the structural integrity of the honeycomb structure; and wherein said die has a control ring having a central opening coupled to the inlet face of said die so as to block the flow of extrudible material into said feed passageways situated under said control ring thereby controlling the peripheral shape and dimensions of the honeycomb structure.

17. An extruder comprising:

an extrusion die of the type having an inlet and outlet face for forming honeycomb structures from extrudible material, said extrusion die comprising:

a plurality of intersecting discharge slots forming appropriately arranged core pins, said slots being of a predetermined width and formed in said die to a predetermined depth in a direction from the outlet face of said die towards the inlet face;

a plurality of mutually independent feed passageways formed in a direction from the inlet face of said die towards the outlet face and communicating with said discharge slots, said fee passageways being placed midway on a side of said core pins, said passageways further having a cross-sectional area larger than the total cross-sectional area of the discharge slots which are fed by said feed passageways; and a bucket having an open upper and a closed lower end coupled to the outlet face of said extrusion die, said bucket further being provided with an evacuation outlet whereby the bucket is evacuated to facilitate the initial drying of said honeycomb structure for maintaining the structural integrity of the honeycomb structure, and wherein said die has a control ring having a central opening coupled to the inlet face of said die so as to block the flow of extrudible material into said feed passageways situated under said control ring, and a collar ring having a central opening coupled to the outlet face of said die, said collar ring forming a L-shaped cavity with said outlet face, said collar ring causing a portion of the extrudible material discharged by one or more discharge slots to merge in said L-shaped cavity thereby forming a coherent thick wall outer shell.

18. An extrusion die according to claim 17 in which said opening in said control ring is larger than that in said collar ring.

19. An extruder comprising:

an extrusion die of the type having an inlet and outlet face for forming honeycomb structures from extrudible material, said extrusion die comprising:

a plurality of intersecting discharge slots forming appropriately arranged core pins, said slots being of a predetermined width and formed in said die to a predetermined depth in a direction from the outlet face of said die towards the inlet face;

a plurality of mutually independent feed passageways formed in a direction from the inlet face of said die towards the outlet face and communicating with said discharge slots, said feed passageways being placed at the intersections of said discharge slots with a spacing corresponding to at least one core pin so that said extrudible material may flow equidistantly in the lateral directions from said intersections, said passageways further having a cross-sectional area larger than the total cross-sectional area of the discharge slots which are feed by said feed passageways; and a bucket having an open upper end and a closed lower end coupled to the outlet face of said extrusion die, said bucket further being provided with an evacuation outlet whereby the bucket is evacuated to facilitate initial drying of said honeycomb structure for maintaining the structural integrity of the honeycomb structure; and wherein said die has a control ring having a central opening coupled to the inlet face of said die so as to block the flow of extrudible material into said feed passageways situated under said control ring, and a collar ring having a central opening coupled to the outlet face of said die, said collar ring forming an L-shaped cavity with said oulet face, said collar ring causing a portion of the extrudible material discharged by one or more discharge slots to merge in said L-shaped cavity therby forming a coherent thick wall outer shell.

20. An extrusion die according to claim 19 in which said opening in said control ring is larger than that in said collar ring.

* * * * *